Sept. 11, 1962

H. PROHASKA ET AL 3,053,337

INSTRUMENT HOUSING FOR MOTOR VEHICLES AND
SWITCH CONSTRUCTION THEREFOR

Filed April 20, 1959

Inventors:
Hans Prohaska
Rolf Anschütz
Ludwig Blücher

Attorneys:

Dicke and Craig

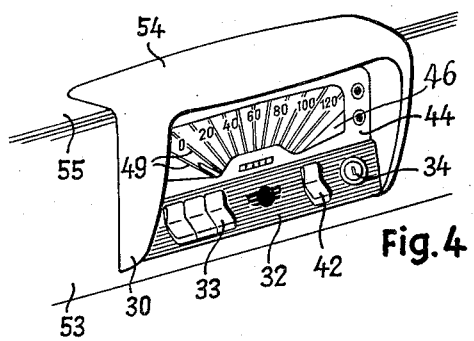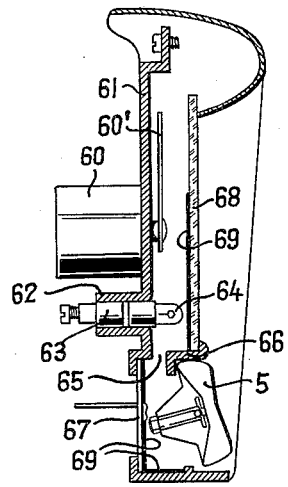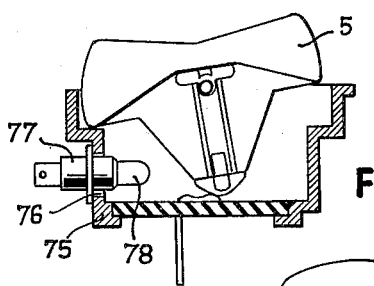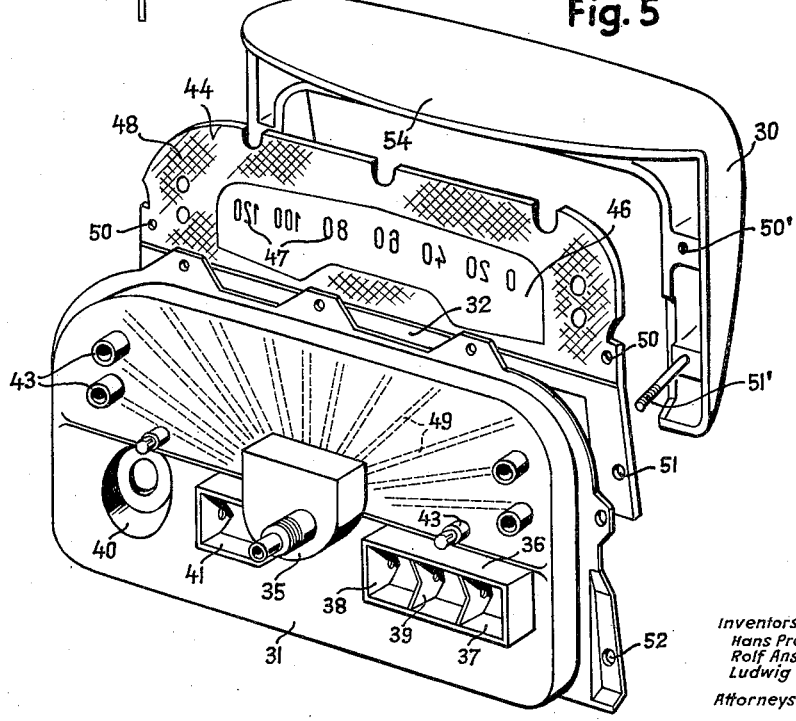

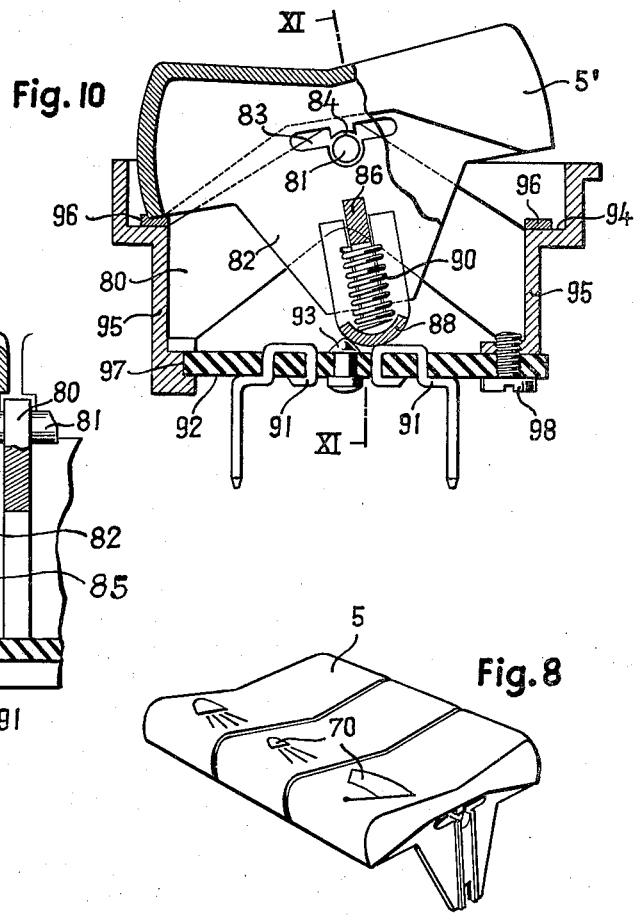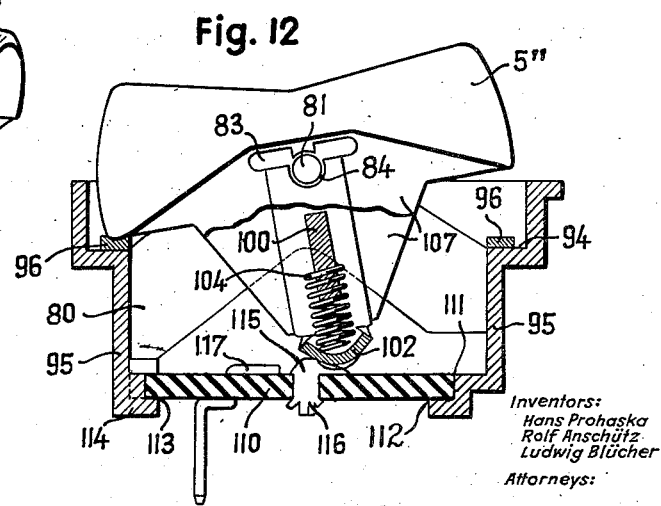

United States Patent Office 3,053,337
Patented Sept. 11, 1962

3,053,337
INSTRUMENT HOUSING FOR MOTOR VEHICLES AND SWITCH CONSTRUCTION THEREFOR
Hans Prohaska, Bietigheim, Rolf Anschütz, Ludwigsburg, and Ludwig Blücher, Bissingen (Enz), Germany, assignor to SWF-Spezialfabrik für Autozubehör Gustav Rau G.m.b.H., Bietigheim, Wurttemberg, Germany
Filed Apr. 20, 1959, Ser. No. 807,659
Claims priority, application Germany Apr. 23, 1958
35 Claims. (Cl. 180—90)

The present invention relates to a new manner of mounting an indicating instrument in a motor vehicle and more particularly to the assembly of such an instrument so as to form a unit together with other apparatus required at the dashboard of a motor vehicle, and further to a new switch construction for such a unit.

Since in driving a motor vehicle the amont of attention which the driver can divert from the road is primarily concentrated upon the speedometer on the dashboard, it is the general object of the present invention to provide a new assembly in which certain control elements which are of particular importance in driving are mounted in the immediate vicinity of the speedometer so as to form a unit therewith. This includes primarily the control switches for operating the various signals, lights, and the like, particularly since their operation very often depends upon the simultaneous observation of the indications of the speedometer.

It is a further object of the present invention to provide a speedometer housing which also forms the housing of a plurality of switches for controlling the electric apparatus of a motor vehicle. Another object of the invention is to provide these switches in the form of toggle switches which are operated by rocking keys which are pivotably mounted on bearing elements which form an integral part of the speedometer housing.

For attaining the same general purpose of combining the instruments of a motor vehicle into a unit, it has already been proposed to utilize the supporting plate of the speedometer, which, however, had to be inserted therein as a separate element, for also mounting other instruments thereon. Due to the progress achieved in the art of injection diecasting of metals or plastics, it has become possible to provide a mounting plate for a speedometer with housing portions for different instruments so that these portions can be cast as integral parts of the plate. However, in every one of these prior proposals the speedometer itself had to be installed in the plate as a separate unit and the dial of this instrument always constituted a part of this unit. The dial therefore had to be either inserted into the mounting plate together with the instrument or it had to be attached subsequently to the instrument.

It has also been previously proposed to mount pushbutton or toggle switches within the lower edge portion of the front frame surrounding the speedometer. However, these switches also formed separate units within their own housings which had to be separately secured to such a frame. Also, with such as assembly the advantages of combining several instrument housings in a common mounting plate or in a common housing were lost almost entirely since it usually required not only a cover frame with openings for the dial of the speedometer and the other instruments but also an outer frame at the front which enclosed this cover frame and also pressed the transparent window plate against a rim on the common mounting plate or housing. At any rate, insofar at the installation of the individual parts in a common mounting plate or housing was concerned, such an assembly did not achieve any particular advantage over the previous manner of mounting the various instruments and parts at different points on the dashboard.

According to the present invention, the construction and assembly of an instrument housing, in which a plurality of instruments, switches, and other parts are combined so as to be closely adjacent to each other and to be easily installed as a single unit in the dashboard of a motor vehicle, is considerably simplified and thus also rendered much more inexpensive by providing a common mounting plate or housing in which all of the most essential instruments and control elements are combined, and which also forms the dial surface of the speedometer. This mounting plate is largely covered by a window plate which is partly made opaque so as to frame the actual dial surface and concentrate the driver's view thereon.

If the common mounting plate according to the invention is to contain several measuring instruments, the same window plate preferably covers all of the instruments which are separated by opaque portions of the window plate. In order to facilitate the installation of this window plate as well as of the entire assembly, the window plate is preferably first secured to an outer frame which is then attached to the mounting plate and serves to secure the entire unit to the dashboard.

A further advantage in the installation of the entire instrument housing unit will be attained according to the invention by providing the front frame to which the window plate is secured also with suitable means for attaching it to the housing unit and securing the entire unit in one operation to the dashboard by inserting it from the front thereof into an aperture in the dashboard. These securing means may consist of no more than one pair of bolts which are cast into the front frame at a downwardly inclined position so that, when they are tightened from the rear of the dashboard, they will automatically draw the frame downwardly so that its rearwardly projecting portion will be drawn tightly upon the upper surface of the dashboard.

Since the common mounting plate of the speedometer and other necessary instruments also contains the various control switches, it is a further important object of the present invention that this mounting plate may also be used as a housing of these switches so that the additional installation of one or more separate switch housings will be avoided, the assembly of the entire unit and particularly of the switches will be considerably simplified, and the cost of production and assembly of the switches and of the entire instrument unit will be greatly reduced.

For attaining this object, the housing parts of the switches are cast integral with the mounting plate and are provided with bearing pins. The keys of the toggle switches according to the inveintion are made of a hollow construction of a suitable plastic material with side walls of a sufficient resilience so that they may be pressed toward each other during the insertion of the key into its housing part and slipped over the bearing pins until the latter snap into bearing holes in the side walls of each key. These bearing pins may also be provided on the keys themselves and may be similarly snapped into bearing holes in the respective housing parts.

In order to increase the resilience of the side walls of the keys without making them too thin and fragile, they may be provided with slots at certain parts thereof, preferably adjacent to the bearing holes therein.

Another important feature of the construction of the new switch consists in the provision of a transverse plate which is inserted into the hollow key of the switch after the same has been inserted into its housing parts which form an integral part of the mounting plate of the speedometer. This transverse plate serves the multiple purpose of bracing the side walls of the key so that the latter will not again slide out of its bearings, for supporting a contact bridge so as to be slidable thereon, and for also supporting a spring which acts upon the contact bridge to connect a pair of stationary contacts with each other when the key is pivoted to one end position, and to disconnect these contacts from each other or to connect another pair of stationary contacts to each other when the key is pivoted to the other end position. These end positions of the pivotal movements of the switch key may also be formed by suitably shaped wall portions of the housing parts. The stationary contacts are secured to a plate which is applied in a simple manner to the open rear side of the housing parts and forms a rear cover thereof to close the switch housing completely.

Since the mentioned spring of the switch which is mounted on the transverse bracing plate exerts a pressure in the direction toward the rear cover plate carrying the switch contacts, it is a further feature of the invention to utilize this pressure also for the purpose of securing the cover plate in a fixed position to close the open side of the switch housing. Thus, it is merely necessary to insert one side of the cover plate at an angle into the open side of the housing and behind an end flange and then to press the other side of the plate toward the inside against the pressure of the spring, and then to slip the plate sideways to fit into a groove in the end of the switch housing opposite to the mentioned end flange. The cover plate is then firmly seated at one side in the groove and at the opposite side in the flange and is securely maintained in this position by the pressure of the spring. Thus, this manner of securing the rear cover plate to the switch housing does not require any screws. Therefore, the usual danger that the threads in the tapped bores of the switch housing might be stripped when the screws on the cover plate are tightened is also avoided.

In order to simplify the assembly of the switch to a still greater degree and to prevent the contact bridge thereof from being pushed out of its guide slots in the transverse bracing plate in the switch key, before the cover plate is attached, the invention further provides according to another embodiment thereof that these guide slots are formed in the two arms of the contact bridge and that they are closed at both ends. The bracing plate is then inserted from the side through these guide slots, whereupon the spring is slipped between the bracing plate and the contact bridge. The lower parts of this bracing plate are preferably extended at both ends and dovetailed relative to the upper parts and the side walls of the hollow switch key are recessed accordingly so that, when the bracing plate is inserted into these recesses in the switch key, the dovetailed portions will interlock and be held in such interlocking position by the resilient outward pressure of the side walls of the key aided by the internal wedging action of the upper parts of the bracing plate.

Since the switch contacts and the connecting terminals thereon must be insulated from each other, it has been found to be the simplest procedure to make the entire rear cover plate of insulating material and to secure the switch contacts and terminals thereto.

Another feature of the invention consists in the provision of suitable means for electrically illuminating the switch keys from the inside. These keys are preferably made of a suitable translucent plastic so that their entire upper surface will be luminous.

For better distinguishing the individual switch keys from each other, they are preferably provided with suitable symbols indicating their particular purpose. These symbols may be either painted or printed upon the outer or inner surfaces of each key or they may be deeply impressed into the surfaces so that the cross-sectional thickness of the material of the upper wall of the key is reduced at these points and the symbol will shine through more strongly as against the surrounding material or the latter may be made opaque so that the back-lighted symbol will stand out strongly from the surrounding opaque parts of the key surface.

The illuminating device may in the most simple form consist of a light bulb which is mounted in a wall portion of the switch housing. However, the usual light for illuminating the dial of the speedometer and other instruments may also be arranged so as also to pass into the switch housing. For this purpose, the switch housing may be provided with a suitable aperture so that the light of the bulb illuminating the speedometer and/or other instruments will also fall into the switch housing where it will be reflected toward the upper key surfaces, for example, by a reflecting coating especially on the bottom surface of the switch housing.

These and other objects, features, and advantages of the present invention will be further apparent from the following detailed description, particularly when read with reference to the accompanying drawings, in which:

FIGURE 4 shows a perspective view of a modification of the assembly illustrated in FIGURE 1;

FIGURE 5 shows an exploded perspective view of the individual parts of the assembly according to FIGURE 4;

FIGURE 6 shows a cross section of an instrument housing similar to those shown in FIGURES 1 to 5 which is provided with a light for illuminating the instrument dial and with an aperture or slot in the housing for also illuminating the switch keys from the rear thereof;

FIGURE 7 shows a cross section of a switch housing similar to that according to FIGURES 1 to 5 but provided with a light for directly illuminating a switch key from the rear thereof;

FIGURE 8 shows three adjacent switch keys with indicating symbols thereon;

FIGURE 9 shows one of the keys with an illuminated symbol thereon;

FIGURE 10 shows a side view largely in section of a modification of the switch construction according to the invention;

FIGURE 11 shows a cross section taken along lines XI—XI of FIGURE 10;

FIGURE 12 shows a further modification of the switch construction according to the invention; while

Figure 1:
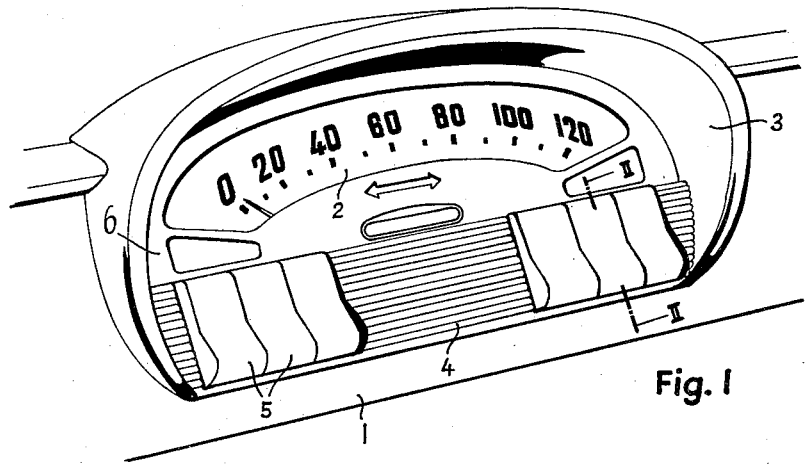
FIGURE 1 shows a perspective view of the combination of a speedometer with a plurality of toggle switches according to the invention mounted as a unit in the dashboard of an automobile.
Figure 2:
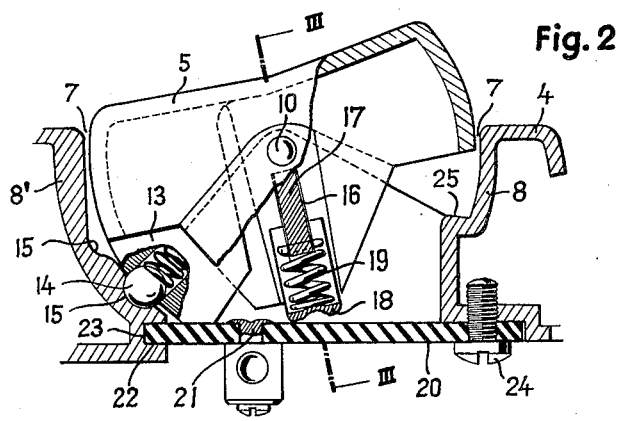
FIGURE 2 shows a side view of a part of the speedometer housing and a toggle switch mounted in the housing, partly shown in a cross section taken along line II—II of FIGURE 1.
Figure 3:
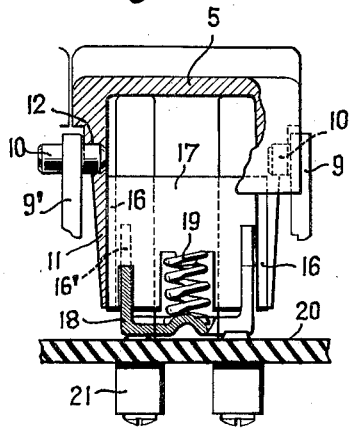
FIGURE 3 shows a cross section taken along line III—III of FIGURE 2.

Referring to the drawings, FIGURES 1 to 3 show a speedometer with a dial 2 as being mounted within the instrument dashboard 1 of a motor vehicle and within a projecting framelike housing 3 which shields the dial 2 from direct light from the outside. The lower part of this housing 3 forms an inclined panel 4 in which a plurality of toggle switches which are operated by keys 5 are mounted for controlling the different signal and light circuits as well as other electrical apparatus of the motor vehicle. The speedometer itself may be mounted either in a mounting plate or housing, not shown, which forms a part separate from the framelike housing 3 or such mounting plate may also form an integral part of housing 3. The mounting plate of the speedometer may be covered by a window plate 6 of glass or plastic which is made partly opaque to cover up the surface of the mounting plate except the part thereof which serves as the dial of the speedometer and which is thus framed by the opaque parts.

FIGURES 2 and 3 show partial cross sections of the framelike housing 3 and one of the toggle switches which are mounted in the lower frame part 4 which for this purpose is provided with an aperture 7 formed by downwardly extending wall portions 8 and 8' which form a box-shaped switch housing with end walls 9 and intermediate transverse walls 9' which are also used as bearing elements for receiving bearing pins 10 on which the keys 5 are pivotably mounted. Of course, the bearing pins 10 may also be secured to or form integral parts of keys 5 and be pivotable in bearing holes in walls 9 and 9'.

Each toggle key 5 consists of a hollow box-shaped member, the side walls 11 of which are sufficiently resilient to permit them to be compressed to such an extent that they can be inserted between the end and intermediate walls 9 and 9' until their bearing holes 12 will snap over the pins 10 so as to be pivotable thereon. The rear wall of each key is reinforced by a portion 13 which contains a spring-supported ball 14 which is adapted to engage in either of two recesses 15 in the rear wall portion 8' of the frame 4 to arrest the key 5 in either of its two end positions. The inner sides of side walls 11 of each key 5 have opposite slots 16 into which, after the key has been inserted between the walls 9 and 9', a transverse plate 17 may be inserted to brace the side walls 11 so that the key cannot again slip out of the bearing pins 10. The upper parts of side walls 11 are increased in thickness so that these parts of two adjacent keys 5 will cover up the partitions 9 and hardly any intermediate gap will be noticeable between the keys.

The inserted transverse plate 17 is provided at its lower end, as seen in FIGURES 2 and 3, with a pair of outer slots in which the two arms of a U-shaped contact bridge 18 are guided which is pressed downwardly by a spring 19 which is mounted in a central recess in plate 17. The switch housing is closed at the bottom by a plate 20 of insulating material which carries a pair of adjacent contacts 2 which are adapted to be connected and disconnected by the contact bridge 18. The insulating plate 20 is inserted with one edge portion 22 into a groove 23 in the rear wall 8' of the housing part 4 and is then secured at the opposite side by a screw 24 to a flange on the front wall 8. It prevents the loosely inserted contact bridge 18 from dropping out and serves as a stop member against which the portion 13 of key 5 engages in the lower end position. If key 5 is depressed in the opposite direction until it engages with a stop surface 25 on the front wall 8, ball 14 slides to the upper seat 15 and contact bridge 18 then connects the two contacts 21 on insulating plate 20 to close the respective circuit.

The modification of the invention, as illustrated in FIGURES 4 and 5, differs from the embodiment according to FIGURES 1 to 3 primarily by the fact that the front frame 30 forms an element separate from the panel carrying the toggle switches. These switches 33 as well as other required parts, for example the ignition switch 34, are mounted on the base plate 31 which also carries on its substantially flat rear surface and integral therewith the speedometer housing 35. Base plate 31 is provided with rearwardly extending wall portions forming a box-shaped switch housing similar to that illustrated in FIGURES 2 and 3 and consisting of upper and lower walls 36 and 37, end walls 38, and intermediate partitions 39. By an aperture 40, base plate 31 also forms the housing of the ignition switch 34 and may be further provided with another box-shaped housing 41 for one or more additional toggle switches 42 and with tubular extensions 43 forming housings for the installation of signal, control, and illuminating lights. Of course, in place of or in addition to these housing parts 41 and 43, differently shaped housing parts may be provided, for example, for additional instruments, such as an oil-pressure gauge, a fuel gauge, a temperature gauge, or the like. All of these housing parts are cast integral with the base plate 31.

The entire front surface of base plate 31, with the exception of the apertures for the insertion and operation of the switch keys 33 and 42 and the ignition switch 34, is covered by a plate 44 of glass or a transparent plastic. Thus, the panel area 32 is also formed by this plate 44. With the exception of the transparent dial area 46 on which the speed numerals 47 are marked and any portions covering the signal or control lights, the rear surface 48 of plate 44 is coated entirely in a suitable manner so as to render it opaque and thereby frame the dial area 46.

The front side of the upper part of base plate 31 is used as a dial surface which may be provided with narrow ribs 49 extended radially from the axis of rotation of the speedometer pointer and serving as speed markings which are associated with the speed numerals 47 on the transparent cover plate 44. These numerals 47 may be formed by etching the cover plate 44 or by painting or gluing them thereon. Cover plate 44 is provided with holes 50 and 51 at opposite sides. The lower holes 51 may be fitted over a pair of bolts 51' which are cast into the side arms of the front frame 30 near the lower ends thereof, and the cover plate 44 will then be attached to frame 30 by screws, not shown, inserted from the rear into holes 50 and screwed into tapped bores 50', so that cover plate 44 will be attached to frame 30 before the final assembly of the entire unit.

After the various parts, that is, the speedometer and possible other instruments, switches, control lights, and the like, have been secured in the respective housing parts 35 to 43, the base plate 31 which is provided with holes 52 near the lower outer edge thereof is fitted over the bolts 51'. The entire unit may then be inserted into a corresponding aperture in the dashboard 53 and may be secured to the latter from the rear by nuts which are screwed on the two bolts 51'. These bolts are preferably downwardly inclined so as to produce a vertical tension whereby the overlapping part 54 of the frame 30 will be drawn tightly against the upper surface 55 of the dashboard 53. Thus, a single pair of bolts 51 will suffice to secure the entire unit to the dashboard.

FIGURE 6 shows a diagrammatic cross section of a modification of the instrument housing with a speedometer therein which is inserted from the front into its housing 60 which is an integral part of the base plate 61. This base plate 61 has a tubular extension 62 containing a light socket 63 for holding a light bulb 64 in a position so that the light illuminates the dial area above the axis of rotation of the speedometer pointer 60' and also passes through a transverse slot 65 in the upper wall 66 of the switch housing so as to illuminate the hollow switch keys 5 from the rear. The inside of the switch housing and the insulating cover plate 67, and preferably also the rear side of the window plate 68 are coated with reflecting surfaces 69. The hollow keys 5 which are of translucent material are thus illuminated from the inside.

As shown in FIGURE 8, the outer surfaces of the keys 5 may be provided with symbols 70 for indicating the purpose of the respective switches. These symbols may form a dark imprint which may be applied in any suitable manner, preferably from the rear, so as to stand out from the illuminated surface of the key.

FIGURE 9 illustrates a switch key 5 in which a symbol 71 is formed by being impressed into the inner side of the key whereby the thickness of the material is reduced at these points allowing the light to shine through the symbol. The other parts of the key are either less translucent because of their greater thickness or they are made entirely opaque.

If the slotted housing construction according to FIGURE 6 is applied to an instrument base plate with a plurality of light bulbs in housing parts 43, as illustrated in FIGURE 5, the bulbs may be arranged so as to illuminate the dial surface underneath the speedometer pointer and so that the light will also fall into the switch housings to illuminate the switch keys.

FIGURE 7 shows another modification of the switch housing similar to that according to FIGURE 2, in which one side wall 75 is provided with an opening 76 into which a light socket 77 is inserted, the bulb 76 of which illuminates the switch key 5 from the rear.

FIGURES 10 to 13 illustrate two modifications of the switch construction according to FIGURES 2 and 3.

FIGURES 10 and 11 show a throw-over switch in a switch housing containing a toggle key 5' which is pivotably mounted on the partitions or end walls 80 of the housing on bearing pins 81. In order to give the side walls 82 of the hollow box-shaped keys 5' a sufficient resilience without making them too thin and weak, these walls 82 are preferably provided with slots 83 adjacent to the bearing holes 84 which reduce the bending resistance of the walls at these points and give them an adequate resilience to be safely compressed for the insertion of the key between and over the bearing points 81.

As previously described with respect to FIGURES 2 and 3, the side walls 82 of each key 5' may also be provided with grooves 85 extending radially to the bearing holes 84. A transverse plate 86 is inserted into these grooves 85 after the key has been snapped over the bearing pins 81 in order to brace the side walls 82 at the inside of the key and prevent the latter from again slipping off the bearing pins 81. This transverse plate 86 has a pair of guide slots 87 in which the two arms of a contact bridge 88 are slidably mounted. Plate 86 also has a central recess 89 and supports therein a spring 90 which presses the contact bridge 88 in the downward direction against one or the other of two pairs of stationary contacts 91 which are secured to the cover plate 92 of insulating material. These two pairs of contacts 91 are separated from each other and in the intervening space a suitable knob 93 is provided which may be formed, for example, by the head of a rivet. As clearly shown in FIGURE 10, in either of the two switching positions of key 5', spring 90 presses the contact bridge 88 firmly against one pair of contacts 91 and at the same time against the knob 93. This knob 93 therefore assumes the function of the ball-and-socket lock of the switch construction according to FIGURE 2, namely, for maintaining the key 5' in one or the other of its two end positions. The recessed portions 94 on walls 95 of the switch housing serving as stop surfaces are preferably provided with rubber cushions 96. Insulating plate 92 is secured to the switch housing by being inserted at one side into a groove 97 and by being secured at the other by a screw 98.

Figure 13:
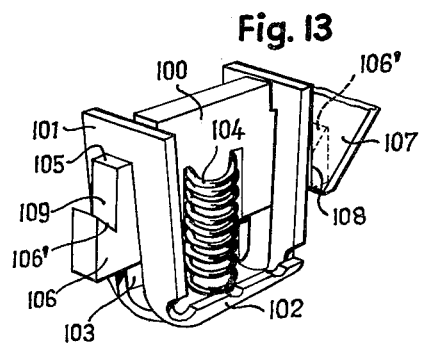
FIGURE 13 shows a perspective view of a part of the switch according to FIGURE 12.

FIGURES 12 and 13 show a circuit breaker, the construction of which differs from the throw-over switch according to FIGURES 10 and 11 primarily by a different manner of securing the transverse bracing plate 100 within the key 5". The two upwardly extending arms 101 of the contact bridge 102 are provided with slots 103 into which the transverse plate 100 is inserted from the side so as to guide the contact bridge thereon in its vertical sliding movements. A spring 104 presses the contact bridge so far downwardly that the upper end walls of slots 103 abut against stop surfaces 105 on bracing plate 100. Contact bridge 102 is thus prevented from sliding off the bracing plate 100 before and while the entire unit as shown in FIGURE 13 is inserted between the side walls 107 of key 5". The lower side of plate 100 is extended at both ends 106 and provided with inwardly inclined upper surfaces 106', while the side walls 107 of key 5" are provided with corresponding recesses 108, the upper end walls of which are likewise inclined. When the bridge unit as shown in FIGURE 13 is slipped from below into key 5" so that the surfaces 109 on plate 100 engage with the opposite inner surfaces of side walls 107 of key 5" the two ends 106 will engage into recesses 108 and the inclined surfaces 106' will dovetail with the corresponding upper end surfaces of recesses 108 and will thereby be locked to side walls 107 of key 5".

For mounting the insulating cover plate 110 on the switch housing so as to close the open rear end thereof, it is merely necessary to pivot key 5" to the end position opposite to that in which it is shown in FIGURE 12, then to tilt the right side of cover plate 110 upwardly and insert it in this position into the opening in the switch housing, and to push the right side of plate 110 over the inner edge 111 of flange 112. Cover plate 110 is thereafter tilted upwardly also at the left side against the pressure of spring 104 and then shifted toward the left so that its left end engages into a groove 113 in the opposite flange 114, while its right end slides off the edge 111 and drops into flange 112.

If the switch according to FIGURES 12 and 13 is to be used as a simple circuit breaker, a knob 115 forming the enlarged head of a rivet 116 in plate 110 will hold key 5" in either of its end positions on one of the cushions 94 or 96. Knob 115 is spaced or insulated from the switch contacts 118 so that, when key 5" is in the position as shown in FIGURE 12, contact bridge 102 will engage with knob 115 but will be insulated from contacts 117, and when it is in the opposite end position, contact bridge 102 will also engage with knob 115 but connect the two contacts 117 with each other. If the switch according to FIGURES 12 and 13 is to be used as a throw-over switch, two pairs of contacts may be mounted on insulating plate 110 in a similar manner as shown in FIGURE 10.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In combination with at least one indicating instrument for motor vehicles, a framelike housing having transversely projecting means defining a housing for each instrument, additional transversely projecting means on said framelike housing defining housing means for electric switches, all of the above mentioned housings being integral, electric switches mounted in their respective housings, each of said switch housings forming a pair of bearing brackets having walls, each of said switches comprising a toggle key having side walls, short bearing pins on one set of said walls and bearing apertures for receiving said pins in the other set of said walls for pivotably mounting said key on said brackets by bending one set of said walls away from the other set while said key is being inserted between said brackets so that said bearing pins, when said walls are released, will spring into said bearing apertures.

2. The combination as defined in claim 1, wherein each of said keys consists of a resilient material so that the side walls thereof may be compressed for inserting said key between said brackets and for inserting said bearing pins into said bearing apertures.

3. The combination as defined in claim 1, wherein each of said keys is of a hollow, substantially boxlike shape having resilient side walls adapted to be pressed toward each other during the insertion of said key between said brackets into its pivotal mounting position and then to spring back to their original position.

4. The combination as defined in claim 2, wherein said side wall portions have apertures therein to increase the resilience of said wall portions.

5. The combination as defined in claim 4, wherein said apertures are in the form of narrow slots extending into said bearing apertures in said side wall portions.

6. The combination as defined in claim 3, wherein each of said hollow keys consists of a translucent material, and means for illuminating said keys from the rear side thereof.

7. The combination as defined in claim 6, wherein the upper wall surfaces of said keys have opaque symbols marked thereon to indicate the purpose of each key, said symbols standing out from the surrounding illuminated surfaces of said keys.

8. The combination as defined in claim 6, wherein the upper wall surfaces of said keys have symbols impressed therein whereby the cross-sectional thickness of said wall surfaces is reduced at the points of said symbols so that the light of said illuminating means will penetrate more easily through said symbols and said symbols will stand out against the surrounding surface portions of said keys.

9. The combination as defined in claim 6, wherein said illuminating means comprise at least one light bulb having a housing forming an integral part of said instrument housing and disposed outside of said switch housing so that said light bulb will illuminate the dial of said instrument, said switch housing having an aperture so that the light of said bulb will also pass through said aperture into said switch housing to illuminate said key from the rear thereof.

10. The combination as defined in claim 9, further comprising means at least within said switch housing for reflecting the light of said bulb.

11. The combination as defined in claim 3, further comprising a transverse plate adapted to be inserted into said key between said side walls for bracing the same.

12. The combination as defined in claim 3, wherein said side walls have grooves therein at the inside of said key, and a transverse plate adapted to be inserted into and secured within said grooves between said side walls for bracing said side walls after said key has been inserted between said brackets.

13. The combination as defined in claim 12, wherein said transverse bracing plate has a pair of apertures therein, a substantially U-shaped contact bridge having a pair of arms slidably mounted in said apertures, and a spring interposed between said bracing plate and said contact bridge.

14. The combination as defined in claim 13, further comprising at least one stationary contact mounted on said switch housing and adapted to be engaged by said contact bridge when said key is pivoted to one end position and to be disengaged from said contact bridge when said key is pivoted to the other end position.

15. The combination as defined in claim 13, further comprising an insulating plate, at least one stationary contact mounted on said plate, and means for securing said plate to the rear end of said switch housing to close the opening thereof.

16. The combination as defined in claim 14, further comprising stop surfaces integral with said switch housing for determining said two end positions.

17. The combination as defined in claim 16, wherein said stop surfaces form a pair of recesses within one wall of said switch housing, and a spring-supported ball mounted within and partly projecting from said key and adapted to engage into either of said recesses for holding said key alternately in one of its two end positions and adapted to slide from one of said recesses to the other when said key is being pivoted.

18. The combination as defined in claim 15, wherein said rear end of said switch housing has at one side a groove for receiving one edge portion of said insulating plate, and a screw for securing the opposite edge portion of said plate to the other side of the rear end of said switch housing.

19. The combination as defined in claim 15, further comprising a projecting knob on said insulating plate adjacent to but spaced from said contact, said contact bridge resiliently engaging with said knob in either of the pivotal end positions of said key for maintaining said bridge and knob in the selected end position, and cushion means on the end walls of said switch housing and within said housing adapted to be resiliently compressed by an inner edge portion on each end wall of said key when said key is pivoted from one to another of its end positions.

20. The combination as defined in claim 11, further comprising a substantially U-shaped contact bridge having a contact portion and a pair of arms extending at a substantially right angle to said contact portion, each of said arms having an elongated aperture therein, said transverse bracing plate extending through said apertures and projecting at both ends from said arms, and a spring interposed between said bracing plate and said contact portion so that said contact bridge is slidable on and guided by said bracing plate against the action of said spring, each of said side walls of said key having a central slot in its rear end with an inclined inner end surface of said slot, each projecting end of said bracing plate having a wedge-shaped notch therein so that, when said plate is inserted into said key, one part of each end of said plate engages against the inner surfaces of said side walls of said key, while the wedgelike parts engage into said slots and interlock with said inclined inner ends of said slots.

21. In combination with at least one indicating instrument for motor vehicles, a framelike housing having transversely projecting means defining a housing for each instrument, additional transversely projecting means on said framelike housing defining housing means for electric switches, all of the above mentioned housing being integral, electric switches mounted in their respective housings, said instrument housing comprising a mounting plate, said instrument having a housing forming an integral part of said mounting plate, said switch housings also forming an integral part of said mounting plate, and an outer frame separate from said mounting plate for securing said mounting plate to the dashboard of a motor vehicle.

22. The combination as defined in claim 21, wherein said mounting plate also forms the dial surface for said instrument having speed indications thereon, said instrument being inserted into its housing from the open front thereof, and a cover plate overlying said mounting plate and having transparent parts over said dial surface and opaque parts overlying other parts of said mounting plate, said cover plate having apertures therein to accommodate said switch keys.

23. The combination as defined in claim 21, wherein said outer frame has an upper portion projecting over an upper surface of the dashboard of a motor vehicle, and further comprising means for securing said outer frame together with said mounting plate to said dashboard, said means comprising at least one pair of bolts secured to said outer frame and extending therefrom at a downwardly inclined direction, so that when said bolts are tightened on said dashboard, they will draw said upper portion of said outer frame tightly upon said upper surface of said dashboard.

24. In combination with at least one indicating instrument for motor vehicles, a framelike housing having transversely projecting means defining a housing for each instrument, additional transversely projecting means on said framelike housing defining housing means for electric switches, all of the above mentioned housing being integral, electric switches mounted in their respective housings, said framelike housing comprising a mounting plate, said instrument having a housing forming an integral part of said mounting plate, and an outer frame separate from said mounting plate for securing the same to the dashboard of a motor vehicle, said outer frame having a plurality of switch housings therein and thereon forming an integral part of said frame, each of said switch housings having an opening at the front surface of said frame, and a toggle switch mounted in each of said switch housings and having a key projecting through said opening in said frame.

25. The combination as defined in claim 22, wherein said mounting plate has a plurality of narrow ribs on the front side thereof extending radially from the axis of rotation of the pointer of said instrument serving as speed markings.

26. The combination as defined in claim 25, wherein said cover plate has a plurality of speed numerals marked thereon adapted to cooperate with said radial ribs on said mounting plate.

27. A toggle switch comprising a substantially boxlike hollow key having resilient side walls, a pair of bearing brackets having walls, short bearing pins on one set of said walls and bearing apertures for receiving said pins in the other set of said walls for pivotably mounting said key on said brackets by compression of said side walls of said key toward each other while said key is being inserted between said brackets so that, when said side walls are released, said bearing pins will spring into said bearing apertures, a transverse plate adapted to be inserted into said key between said side walls for bracing the same after said key has been pivotably mounted between said brackets, a substantially U-shaped contact bridge slidably mounted on and guided by said plate, a spring interposed between said plate and said contact bridge, and at least one stationary contact in a fixed position relative to said brackets and adapted to be resiliently engaged by said contact bridge when said key is pivoted to one end position and to be disengaged from said contact bridge when said key is pivoted to the other end position.

28. A toggle switch as defined in claim 27, further comprising a switch housing having side and end walls and being open at both ends, said brackets forming the side walls of said housing, said switch key substantially closing the front end of said housing, and an insulating plate having said contact thereon closing the rear end of said housing.

29. A toggle switch as defined in claim 28, wherein one of said walls of said housing has a groove therein near the rear end of said housing for receiving one edge portion of said insulating plate, and a portion on the rear end of the opposite wall having a tapped bore therein, and a screw in said bore for securing the opposite edge portion of said insulating plate to said housing.

30. A toggle switch as defined in claim 28, wherein one of said walls of said housing has a groove therein near the rear end of said housing for receiving one edge portion of said insulating plate, and a flange on the rear end of the opposite wall of said housing, said insulating plate being adapted to be inserted into said groove and said flange by first tilting said plate into said housing at the side facing toward said flange, then tilting the opposite side of said plate against the action of said spring on said contact bridge, and then sliding said plate sideways toward and into said groove and thereby settling the other side of said plate in said flange, whereby said insulating plate will be secured to said switch housing by the pressure of said spring.

31. A toggle switch as defined in claim 28, wherein said key consists of a translucent material, and means for illuminating said key from the inside thereof.

32. A toggle switch as defined in claim 28, further comprising a projecting knob on said insulating plate adjacent to but spaced from said contact, said contact bridge resiliently engaging with said knob in either of the pivotal end positions of said key for maintaining said bridge and key in the selected end position, and cushion means on said end walls of said housing and within said housing adapted to be resiliently compressed by an inner edge portion on each end wall of said key when said key is pivoted from one to another of its end positions.

33. A toggle switch as defined in claim 28, wherein said contact bridge has a contact portion and a pair of arms extending at a substantially right angle to said contact portion, each of said arms having an elongated aperture therein, said bracing plate extending through said apertures and projecting at both ends from said arms, said spring being interposed between said bracing plate and said contact portion so that said contact bridge is slidable on and guided by said bracing plate against the action of said spring, each of said side walls of said key having a central slot in its rear end with an inclined inner end surface of said slot, each projecting end of said bracing plate having a wedge-shaped notch therein so that, when said plate is inserted into said key, one part of each end of said plate engages against the inner surfaces of said side walls of said key, while the wedgelike parts engage into said slots and interlock with said inclined inner ends of said slots.

34. A framelike housing having transversely projecting means defining a housing, additional transversely projecting means on said framelike housing defining housing means for electric switches, all of the above mentioned housings being integral, electric switches mounted in their respective housings, each of said switch housings forming a pair of bearing brackets having walls, each of said switches comprising a toggle key having resilient side walls, short bearing pins on one set of said walls and bearing apertures for receiving said pins in the other set of said walls for pivotably mounting said key on said brackets by bending one set of said walls away from the other set while said key is being inserted between said brackets so that said bearing pins, when said walls are released, will spring into said bearing apertures.

35. A framelike housing adapted to be inserted into a dashboard of a motor vehicle and having transversely projecting means defining recess means, additional transversely projecting means on said framelike housing defining housing means for electric switches, all of the above mentioned housings being integral, electric switches mounted in their respective housings, each of said switch housings forming a pair of bearing brackets having walls, each of said switches comprising a toggle key having resilient side walls, short bearing pins on one set of said walls and bearing apertures for receiving said pins in the other set of said walls for pivotably mounting said key on said brackets by bending one set of said walls away from the other set while said key is being inserted between said brackets so that said bearing pins, when said walls are released, will spring into said bearing apertures.

References Cited in the file of this patent

UNITED STATES PATENTS

| | | |
|---|---|---|
| 1,692,601 | Wheeler | Nov. 20, 1928 |
| 1,795,566 | MacComb | Mar. 10, 1931 |
| 1,888,444 | Batcheller | Nov. 22, 1932 |
| 2,554,506 | Schwartz | May 29, 1951 |
| 2,855,066 | Nallinger | Oct. 7, 1958 |
| 2,858,631 | Jorick | Nov. 4, 1958 |
| 2,879,345 | Mossman | Mar. 24, 1959 |